United States Patent
Tatsumoto et al.

(10) Patent No.: US 9,362,541 B2
(45) Date of Patent: Jun. 7, 2016

(54) MAGNESIUM CELL AND MAGNESIUM CELL SYSTEM

(71) Applicant: KONICA MINOLTA, INC., Chiyoda-ku (JP)

(72) Inventors: Yuhei Tatsumoto, Toyokawa (JP); Yasutaka Tanimura, Nara (JP); Tomonobu Tamura, Toyokawa (JP); Hiroshi Hiraguchi, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 81 days.

(21) Appl. No.: 14/301,850

(22) Filed: Jun. 11, 2014

(65) Prior Publication Data

US 2014/0370359 A1 Dec. 18, 2014

(30) Foreign Application Priority Data

Jun. 12, 2013 (JP) ................................. 2013-123646

(51) Int. Cl.
| | |
|---|---|
| *H01M 2/14* | (2006.01) |
| *H01M 2/16* | (2006.01) |
| *H01M 10/054* | (2010.01) |
| *H01M 2/18* | (2006.01) |
| *H01M 4/134* | (2010.01) |
| *H01M 10/04* | (2006.01) |
| *H01M 10/42* | (2006.01) |

(52) U.S. Cl.
CPC .......... *H01M 2/1673* (2013.01); *H01M 2/1686* (2013.01); *H01M 2/18* (2013.01); *H01M 4/134* (2013.01); *H01M 10/0468* (2013.01); *H01M 10/054* (2013.01); *H01M 10/4214* (2013.01)

(58) Field of Classification Search
None
See application file for complete search history.

(56) References Cited

U.S. PATENT DOCUMENTS

| | | | |
|---|---|---|---|
| 5,250,370 A | 10/1993 | Faris | |
| 6,299,998 B1 | 10/2001 | Morris et al. | |
| 2004/0038120 A1* | 2/2004 | Tsai | H01M 12/065 429/66 |
| 2005/0100781 A1* | 5/2005 | Jang | H01M 6/38 429/61 |
| 2005/0264979 A1* | 12/2005 | Breyen | A61N 1/375 361/517 |
| 2007/0154766 A1* | 7/2007 | Baik | H01M 12/06 429/405 |
| 2007/0202394 A1* | 8/2007 | Viavattine | H01M 2/16 429/144 |
| 2011/0117454 A1* | 5/2011 | Winther-Jensen | H01B 1/122 429/402 |

FOREIGN PATENT DOCUMENTS

| | | |
|---|---|---|
| EP | 2 701 232 A1 | 2/2014 |
| JP | 2012-015013 A | 1/2012 |
| JP | 2012-089328 A | 5/2012 |
| JP | 2012-234799 A | 11/2012 |

OTHER PUBLICATIONS

Machine translation of JP 2012-089328 published May 2012.*
Office Action (Notification of Reason(s) for Refusal) issued on May 12, 2015, by the Japanese Patent Office in corresponding Japanese Patent Application No. 2013-123646, and an English translation of the Office Action. (7 pages).

* cited by examiner

*Primary Examiner* — Patrick Ryan
*Assistant Examiner* — Wyatt McConnell
(74) *Attorney, Agent, or Firm* — Buchanan Ingersoll & Rooney PC

(57) ABSTRACT

A magnesium cell includes a positive electrode, a negative electrode including a magnesium alloy, and a separator disposed between the positive electrode and the negative electrode to hold an electrolytic solution, in which a contact area between the negative electrode and the separator is variable.

9 Claims, 10 Drawing Sheets

MAGNESIUM CELL AND MAGNESIUM CELL SYSTEM

This application is based on Japanese patent application No. 2013-123646 filed on Jun. 12, 2013, the contents of which are hereby incorporated by reference.

BACKGROUND OF THE INVENTION

1. Field of the Invention

The present invention relates to a magnesium cell and a magnesium cell system.

2. Description of the Related Art

Magnesium cells have recently received attention as next-generation high-capacity cells as an alternative to lithium ion batteries.

An ordinary magnesium cell is provided with a negative electrode having an extraction electrode and a negative electrode fuel including a magnesium alloy which contains aluminum and calcium, an electrolytic solution for eluting magnesium ions from the negative electrode fuel, a separator for holding the electrolytic solution therein, and a positive extraction electrode. In such a magnesium cell, chemical reactions take place at the negative electrode fuel and the electrolytic solution, which produces electric power (Japanese Laid-open Patent Publication No. 2012-234799).

A magnesium cell has the following advantages:
(1) Magnesium is an abundant element and relatively inexpensive.
(2) Magnesium has a large energy capacity per unit volume.
(3) Magnesium cell is compact and can realize high-capacity cell.
(4) Magnesium cell is renewable energy and is environmentally friendly.

As described above, in the conventional magnesium cells, the magnesium alloy and the electrolytic solution come to contact with each other, so that chemical reactions take place. Thereby, electromotive force is generated, which allows for supply of electric power as cells.

However, in the conventional magnesium cells, once the chemical reactions start, stopping the same is difficult, which results in fast consumption of the cell capacity. For this reason, in some instances, it is difficult to supply necessary electric power stably when needed.

SUMMARY

The present disclosure is directed to solve the problems pointed out above, and therefore, an object of an embodiment of the present invention is to provide a magnesium cell which allows for stable supply of necessary electric power when needed, and also allows for efficient use of magnesium fuel.

According to one aspect of the present invention, a magnesium cell includes a positive electrode; a negative electrode including a magnesium alloy; and a separator disposed between the positive electrode and the negative electrode to hold an electrolytic solution; wherein a contact area between the negative electrode and the separator is variable.

These and other characteristics and objects of the present invention will become more apparent by the following descriptions of preferred embodiments with reference to drawings.

DESCRIPTION OF THE PREFERRED EMBODIMENTS

[Explanation of Magnesium Cell]

First off, a typical structure of a magnesium cell is described. The structure of the magnesium cell is detailed in Japanese Laid-open Patent Publication No. 2012-234799. The brief description of the structure is provided below.

Figure 9:
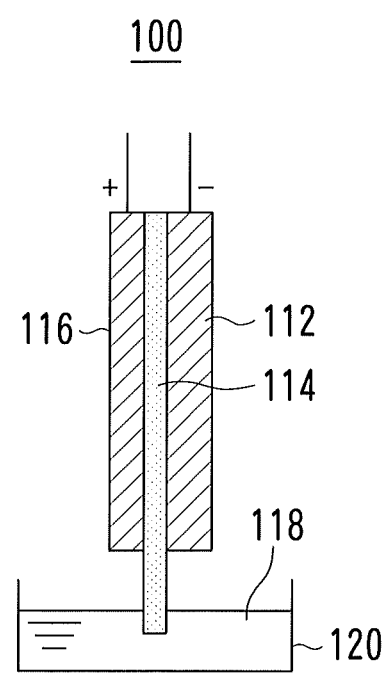
FIG. 9 is a diagram illustrating a typical structure of a magnesium cell.

Referring to FIG. 9, a cell (magnesium cell) 100 includes a negative electrode material 112 including a magnesium alloy, a positive electrode collector 116 for supplying electrons to air (oxygen) as a positive electrode material, a separator 114 disposed between the negative electrode material 112 and the positive electrode collector 116, an electrolytic solution 118 for eluting magnesium ions ($Mg^{2+}$) from the negative electrode, and an electrolytic solution tank 120 for storing the electrolytic solution 118.

The negative electrode material (negative electrode) 112 is composed of a magnesium alloy. The magnesium alloy means an alloy based on magnesium (Mg), for example, an alloy containing 50 wt % or more magnesium. For example, Mg—Al alloys, Mg—Mn alloys, Mg—Zn alloys, Mg—Al—Zn alloys and Mg—Zn—Zr alloys are known as magnesium alloys. Elements other than aluminum and calcium may be added to the magnesium alloy. Examples of such additional elements include Zn, Mn, Si, Cu, Li, Na, K, Fe, Ni, Ti and Zr.

The shapes of the magnesium alloy used as the negative electrode material 112 are not particularly limited. For example, the magnesium alloy may be shaped into a sheet, particles or powder. In this description, a magnesium alloy containing aluminum (Al) and calcium (Ca) is used.

The separator 114 is disposed between the negative electrode material 112 and the positive electrode collector 116. The separator 114 prevents a short circuit between the negative electrode material 112 and the positive electrode collector 116, and also has a role of drawing up the electrolytic solution 118 reserved in the electrolytic solution tank 120 and holding the electrolytic solution 118. The separator 114 is not particularly limited. Examples of the separator 114 include polyethylene fibers, polypropylene fibers, glass fibers, resin nonwoven fabrics, glass nonwoven fabrics, and filter paper.

The positive electrode collector (positive electrode) 116 has a role of supplying electrons to oxygen in the air as the positive electrode material. The material of the positive electrode collector 116 is not particularly limited as long as the material has conductivity. The material of the positive electrode collector 116 may be, for example, carbonaceous materials such as activated carbons, carbon fibers and carbon felts, and metal materials such as iron and copper. Particularly preferably, a carbon powder is used as the material of the positive electrode collector 116 in view of the facts that this material has a large area of contact with atmospheric oxygen and has excellent collection efficiency.

The electrolytic solution 118 serves as a medium in which magnesium ions ($Mg^{2+}$) formed at the negative electrode material 112 are eluted, and also has a role of supplying water ($H_2O$) to the positive electrode for the reaction with oxygen. The electrolytic solution 118 may be an acidic, alkaline or neutral aqueous solution. The electrolytic solution 118 may be, for example, an aqueous sodium chloride solution, an aqueous sodium hydroxide solution, an aqueous sodium hydrogencarbonate solution and an aqueous sodium percarbonate solution. The electrolytic solution 118 may be, for example, aqueous fluoride solutions and halogen-containing aqueous solutions. The electrolytic solution 118 may be, for example, an aqueous polyvalent carboxylate solution as that disclosed in Japanese Laid-open Patent Publication No. 2010-182435. The electrolytic solution 118 may be a mixture of different solutions.

The shape and material of the electrolytic solution tank 120 are not particularly limited as long as the electrolytic solution 118 can be reserved therein. For example, the electrolytic solution tank 120 may be a container formed of a synthetic resin such as polypropylene.

Wires or the like made of a conductive material such as copper may be attached to the surface of the positive electrode collector 116 in contact with air. This structure increases the area of contact between the positive electrode collector 116 and oxygen, and further enhances the power collection efficiency at the positive electrode of the cell 100.

While the cell 100 in FIG. 9 is illustrated as having a sequential stack of the negative electrode material 112, the separator 114, and the positive electrode collector 116, the structure of the cell 100 is not limited thereto. For example, the cell 100 may have a structure in which the separator 114 and the positive electrode collector 116 are sequentially wound around a sheet of the negative electrode material 112.

The reactions taking place at the positive electrode and the negative electrode of the cell 100 are represented by the following equations, respectively.

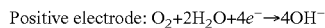
Positive electrode: $O_2 + 2H_2O + 4e^- \rightarrow 4OH^-$

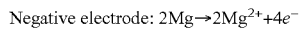
Negative electrode: $2Mg \rightarrow 2Mg^{2+} + 4e^-$

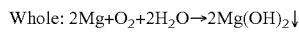
Whole: $2Mg + O_2 + 2H_2O \rightarrow 2Mg(OH)_2 \downarrow$

Magnesium in the negative electrode is eluted into the electrolytic solution in the form of magnesium ions by releasing electrons. On the other hand, oxygen and water receive the electrons at the positive electrode to form hydroxide ions. As a whole of the cell, magnesium, oxygen and water form magnesium hydroxide ($Mg(OH)_2$) while developing electromotive force between the electrodes.

[Magnesium Cell According to Embodiments of the Present Invention]

In the practice of the present invention, the cell 100 described with reference to FIG. 9 may take a number of configurations. The following is a description of a magnesium cell according to embodiments of the present invention.

In the embodiments, the negative electrode of the foregoing equation is provided with a fuel member that includes a magnesium alloy and is contactable to a separator, and a negative electrode member which is disposed to be in contact with the fuel member and is operable to extract current. The fuel member and the negative electrode member in the embodiments form the negative electrode, and the negative electrode corresponds to the negative electrode material 112 shown in FIG. 9.

The fuel member is sandwiched between the negative electrode member and the separator, and is slidable therebetween. Stated differently, the fuel member is movable in the insertion and removal directions while maintaining contact with the negative electrode member and the separator. When being used, magnesium as the fuel member is eluted into the electrolytic solution and is reduced. Therefore, the fuel member is pushed to move downward, so that a new (unused) part of the fuel member is supplied as the negative electrode instead of the old (used) part.

According to the magnesium cell of this embodiment, the fuel member is pushed gradually to be additionally supplied as the negative electrode. This makes it possible to extract necessary electric power when needed and to supply the electric power to a load in a stable manner for a long term. In particular, it is possible to control electric power produced as a cell by adjusting an amount of additional supply by controlling the insertion amount (travel distance) of the fuel member.

The positive electrode is a current extracting electrode member which is to serve as the positive electrode collector shown in FIG. 9. The positive electrode is placed so as to be in contact with the separator holding the electrolytic solution therein. Stated differently, the separator is disposed between the positive electrode and the negative electrode. The separator prevents a short circuit between the positive electrode and the negative electrode.

The foregoing chemical reactions take place by the contact through the separator between the fuel member of the negative electrode and the electrolytic solution, so that electromotive force of the cell is generated. In the embodiments, an area of a contact part in which the negative electrode and the separator touch each other is variable. This allows for production of any electric power.

In the meantime, cell characteristics are represented based on the following two values:
(1) the total current produced per unit weight of a fuel member (a negative electrode) (=capacitance Ah/g); and
(2) the total electric power which is a product of the total current multiplied by voltage (=energy density Wh/g). The capacitance (Ah/g) is determined from the atomic weight of the metal used in the fuel member, the charge number of ions, and the charge of electrons, and directly reflects the characteristics of the metal used in the fuel member. The theoretical capacitance of pure magnesium is 2.2 Ah/g. In the embodiments, the magnesium alloy (alloy containing magnesium in, for example, 92 wt %) is used. In such a case, the capacitance of this magnesium alloy is, for example, 1.63 Ah/g, and approximately 80% of the electricity available according to the theoretical capacitance is produced, which allows for highly efficient production of electricity.

The energy density is related to the voltage occurring in a cell. According to the ionization potential of the metal, magnesium cells have a possibility of producing 2.37 V potential. However, the voltage occurring in a cell and thus the available energy density are significantly affected by the characteristics of the positive electrode. Because fuel cells, in particular, are of such a type that the positive electrode material is oxygen in air, the problem is how to react magnesium ions with oxygen so as to realize efficient extraction of charges. Thus, the energy density is affected not only by the performance of the fuel member as the metal electrode (the negative electrode) but also by the configuration of the positive electrode such as materials, catalysts and structures.

As described above, the magnesium cell of the embodiments includes the negative electrode (fuel member+negative electrode member), the positive electrode (current extracting electrode member), and the separator for holding the electrolytic solution therein. The separator is disposed between the negative electrode and the positive electrode. The electromotive force of the cell is generated by the contact through the separator between the fuel member of the negative electrode and the electrolytic solution. In other words, the supply amount of the fuel member, or, a contact area in which the fuel member and the separator touch each other (an area of a part in which the fuel member is in contact with the electrolytic solution) is adjusted. Thereby, the degree of chemical reaction in the magnesium cell is controlled, which makes it possible to produce any amount of electric power. The relationship between the supply amount of the fuel member or the contact area in which the fuel member and the separator touch each other, and the amount of electric power supplied by the cell depends on the actual structure of the magnesium cell.

In the embodiments, as an example of the method for adjusting the contact area in which the fuel member comes into contact with the separator, control is performed based on a table showing the correlation between the contact area and the supply amount of electric power. To be specific, in order to produce electric power corresponding to consumed electric power, the contact area is automatically varied in accordance with ON/OFF of the power of an electronic device which is supplied with electric power from the magnesium cell, or in accordance with transition of operation modes of the electronic device.

First Embodiment

Figure 1A:
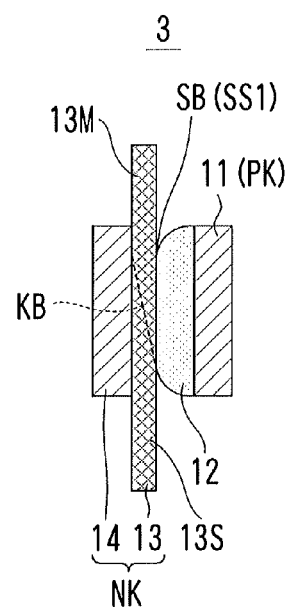
FIGS. 1A-1C are diagrams illustrating a magnesium cell according to a first embodiment of the present invention.
Figure 1B:
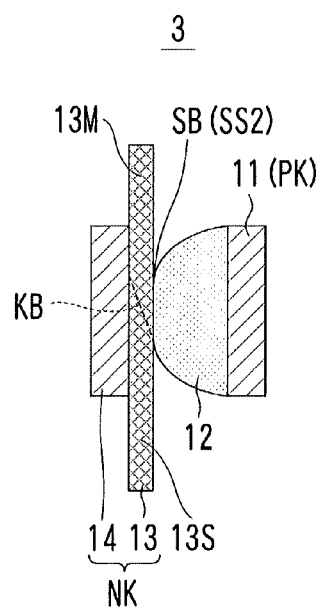
Figure 1C:
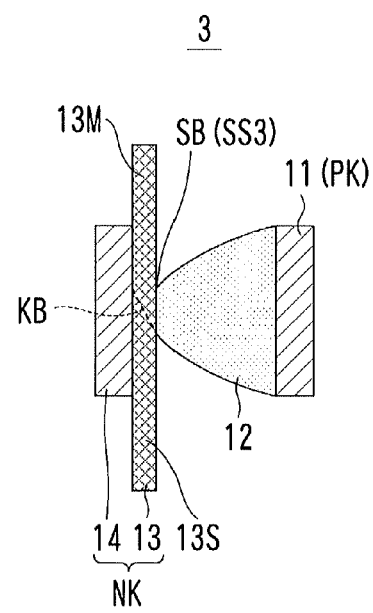

FIGS. 1A-1C are diagrams for illustrating a magnesium cell 3 according to a first embodiment of the present invention.

Referring to FIGS. 1A-1C, the magnesium cell 3 includes a positive electrode member 11, a separator 12, a fuel member 13, and a negative electrode member 14.

The positive electrode member 11 is a current extracting electrode member serving as a positive electrode collector. Examples of the positive electrode member 11 include metal materials such as iron and copper, or carbonaceous materials such as activated carbons, carbon fibers, carbon felts, and carbon powder. The positive electrode member 11 may have a plate-like shape, band-like shape, block-like shape, and any other shapes. The positive electrode member 11 itself serves as a positive electrode PK.

The separator 12 is made of a porous material which enables the separator 12 to hold the electrolytic solution therein. The separator 12 is placed so as to be in contact with the positive electrode member 11. The separator 12 has a large surface area because a large number of microscopic pores are formed inside the separator 12. Thereby, the separator 12 has strong adsorptive properties to gas, liquid molecules, and ions. The electrolytic solution is impregnated into the separator 12 and held therein.

The separator 12 is made of, for example, polyethylene fibers, polypropylene fibers, glass fibers, resin nonwoven fabrics, glass nonwoven fabrics, or filter papers.

The separator 12 has appropriate elasticity. When a pressing force is applied to the separator 12 from the positive electrode member 11 side to the fuel member 13 side, the separator 12 deforms elastically. Depending on the deformation amount, the contact area between the separator 12 and the fuel member 13 is variable.

The separator 12 is made of, for example, a sponge-like material. Alternatively, the separator 12 is configured in such a manner that the both ends of a nonwoven fabric are fixed to the both ends of the positive electrode member 11, a soft pad is placed inside the nonwoven fabric, and the soft pad is movable. This makes it possible to adjust the contact area correctly, and to assure endurance.

The fuel member 13 includes a magnesium alloy. The fuel member 13 is placed so as to come into contact with the separator 12. The fuel member 13 is movable between the separator 12 and the negative electrode member 14 while maintaining the contact therewith. The fuel member 13 may be shaped into, for example, a plate, sheet, particles, grains, powder, or other shapes. The fuel member 13 may be one processed into a variety of shapes.

The negative electrode member 14 is a current extracting electrode member serving as a negative electrode collector. Examples of the negative electrode member 14 include metal materials such as iron and copper, or conductive materials including carbon. The negative electrode member 14 is so placed that the negative electrode member 14 comes into contact with the fuel member 13 to serve as one electrode (negative electrode). In short, the fuel member 13 and the negative electrode member 14 constitute a negative electrode NK.

Referring to FIG. 1A, the separator 12 is pressed against the fuel member 13 by the positive electrode member 11. Thereby, the separator 12 is deformed largely in an elastic manner, and an area (contact area) SS1 of the contact part SB between the fuel member 13 and the separator 12 has a maximum size in the magnesium cell 3.

Referring to FIG. 1B, the distance between the fuel member 13 and the positive electrode member 11 is larger than that in the case of FIG. 1A. Thereby, the deformation amount of the separator 12 is reduced and a contact area SS2 is also reduced as compared to the case of FIG. 1A.

Referring to FIG. 1C, the distance between the fuel member 13 and the positive electrode member 11 is further larger than the case of FIG. 1B. Thereby, the deformation amount of the separator 12 is further reduced and a contact area SS3 has a minimum size in the magnesium cell 3.

As discussed above, the contact area SS is varied by the deformation of the separator 12 due to the movement of the positive electrode member 11. When the contact area SS is varied, the degree or speed of chemical reaction in the magnesium cell 3 changes, which causes the magnesium cell 3 to produce electric power depending on the change.

In the examples of FIGS. 1A-1C, the entirety of the positive electrode member 11 moves parallel to the fuel member 13. Instead of this, the positive electrode member 11 may move in other different ways. For example, another arrangement is possible in which the positive electrode member 11 rotates around a specific position, and the separator 12 sandwiched between the rotating positive electrode member 11 and the fuel member 13 deforms, and thereby, the contact area SS is varied.

Figure 2A:
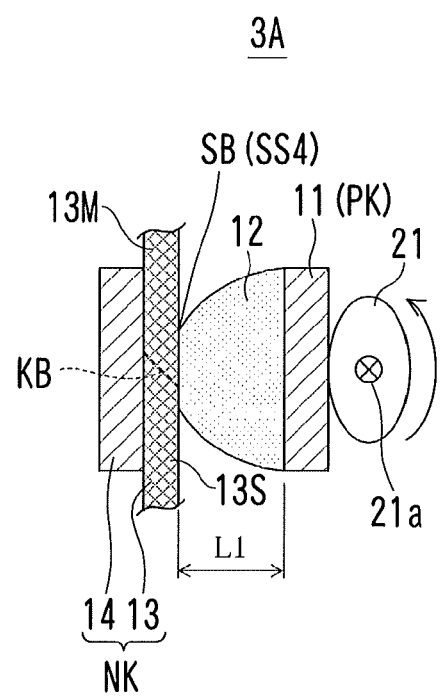
FIGS. 2A and 2B are diagrams showing an example of a magnesium cell according to a first embodiment.
Figure 2B:
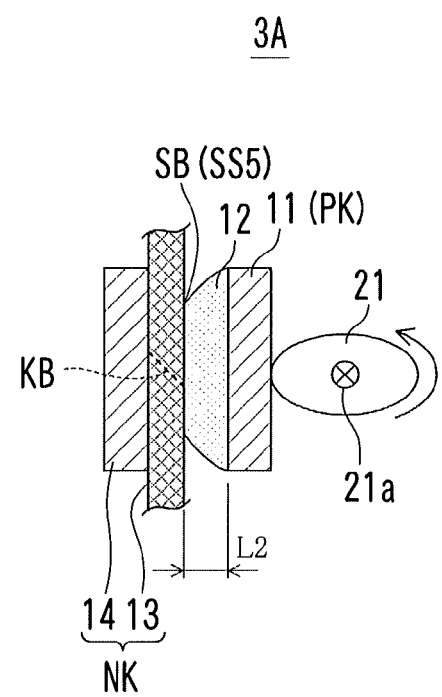

FIGS. 2A and 2B show an example of the magnesium cell 3 of the first embodiment in which the movement mechanism of the positive electrode member 11 is specifically shown.

Referring to FIGS. 2A and 2B, a magnesium cell 3A is provided with a cam member 21 which rotates around an axis 21a in order to move the positive electrode member 11 of the magnesium cell 3 as described above.

The cam member 21 has a substantial elliptical shape. The cam member 21 rotates around the axis 21a, which moves the positive electrode member 11 by a distance corresponding to the difference between the small diameter and the long diameter of the cam member 21.

Referring to FIG. 2A, the distance between the fuel member 13 and the positive electrode member 11 is a maximum distance in the magnesium cell 3A, and a contact area SS4 has a minimum size. Referring to FIG. 2B, the distance between the fuel member 13 and the positive electrode member 11 is short, and a contact area SS5 has a large size.

The contact area may be adjusted to have any value of the range from SS4-SS5 by setting the angle of the rotational position of the cam member 21 arbitrarily.

The mechanism for moving the positive electrode member 11 is not limited to that of the cam member 21 shown in FIGS. 2A and 2B, and may be any other mechanisms.

In each of FIGS. 1A-2B, an oblique-broken line is shown in the middle of the fuel member 13. The oblique-broken line indicates a boundary KB between a used part 13S and an unused part 13M. To be specific, the fuel member 13 is configured in such a manner that, when a part thereof contacting the separator 12 is spent, the fuel member 13 is moved downward in the drawing by manual operation or an appropriate driving device, and thereby, the unused part 13M comes into contact with the separator 12 to cause the chemical reaction as a cell depending on the contact area SS. As for the used part 13S, the fuel member 13 is entirely structured to have elasticity, and the used part 13S is reeled up, which is space-saving.

Second Embodiment

Figure 3A:
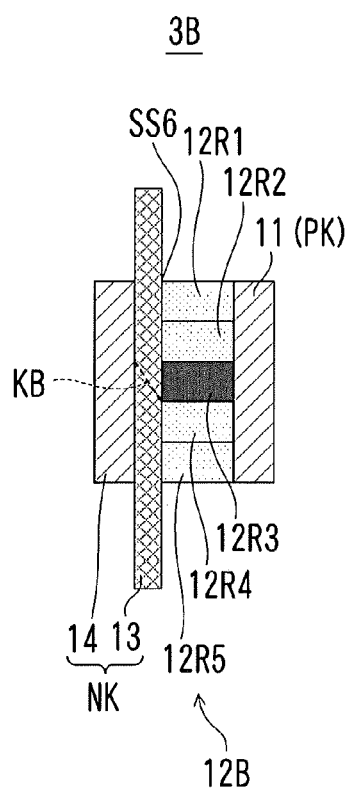
FIGS. 3A-3C are diagrams illustrating a magnesium cell according to a second embodiment of the present invention.
Figure 3B:
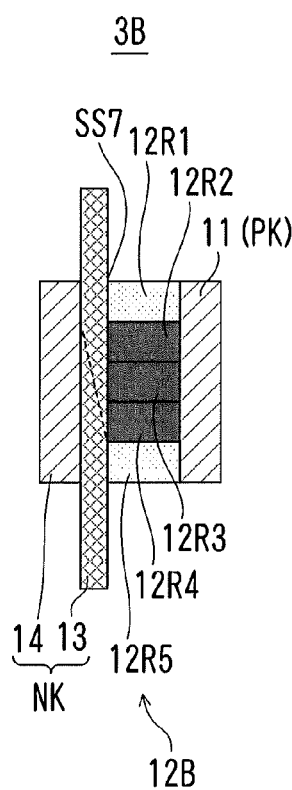
Figure 3C:
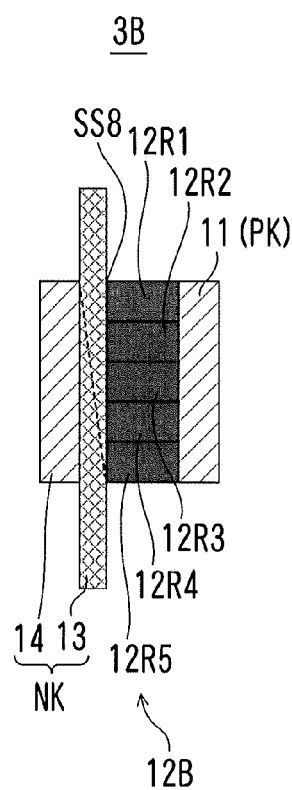

FIGS. 3A-3C are diagrams illustrating a magnesium cell 3B according to the second embodiment of the present invention. In FIGS. 3A-3C, elements that have the same functions as those in FIG. 1A-1C are identified with the identical reference symbols, and the description thereof will not be repeated or will be simplified. The same applies to the descriptions hereinafter.

Referring to FIGS. 3A-3C, the magnesium cell 3B includes the positive electrode member 11, a separator 12B, the fuel member 13, and the negative electrode member 14.

The separator 12B includes a plurality of separator chambers 12R1, 12R2, ..., and 12R5 which are partitioned and provided on a plane along the surface of the fuel member 13 of the negative electrode NK. The contact area SS with the fuel member 13 is varied by selectively supplying an electrolytic solution to the separator chambers 12R1, 12R2, ..., and 12R5 to cause the same to hold the electrolytic solution therein.

To be more specific, the separator 12B includes the separator chambers 12R1, 12R2, ..., and 12R5 which are partitioned by vertical planes on the surface of the positive electrode member 11 and the surface of the fuel member 13. The contact area SS can be changed depending on whether or not the electrolytic solution is supplied to each of the separator chambers 12R.

Figure 4:
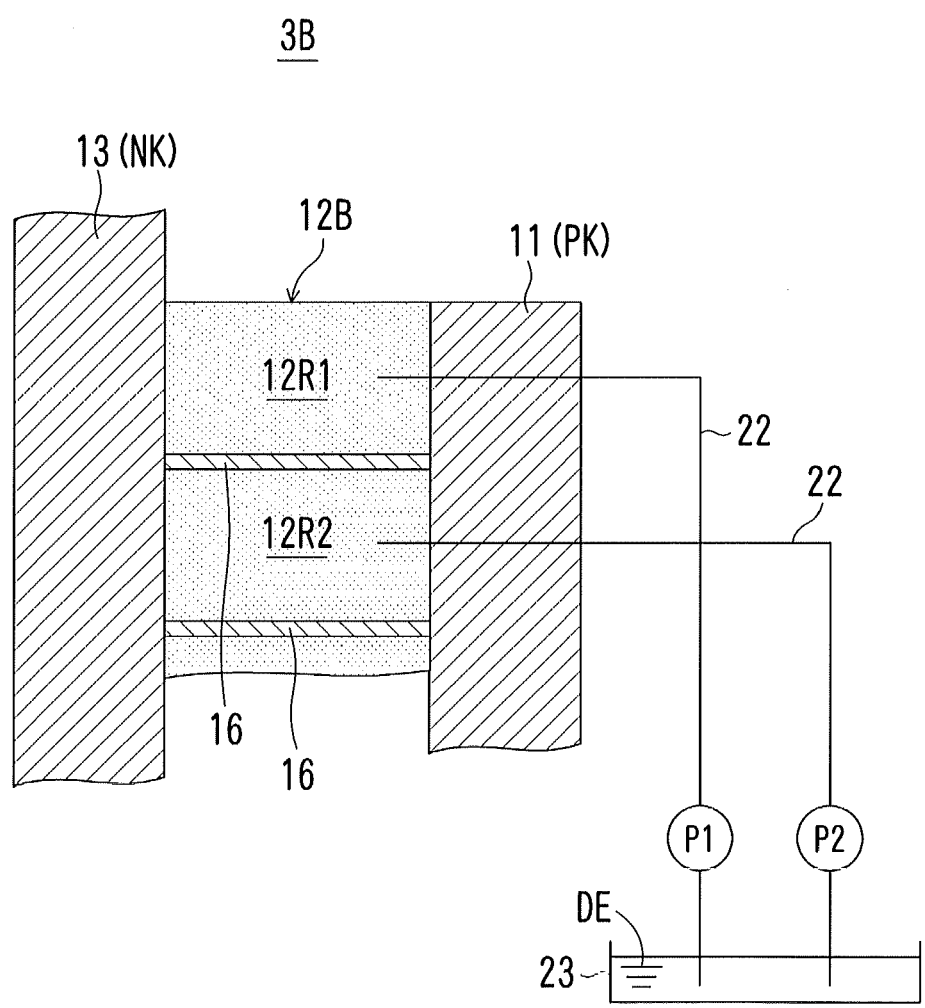
FIG. 4 is a diagram showing an example of a magnesium cell according to a second embodiment.

Referring to FIG. 4, the separator chambers 12R are separated from each other by partition members 16, 16, ..., and 16. Each of the separator chambers 12R is supplied with the electrolytic solution DE contained in an electrolytic solution tank 23 through a tube 22 by drive of a pump P. This makes it possible to control whether or not to supply the electrolytic solution DE to each of the separator chambers 12R. The pump P is provided separately in each of the separator chambers 12R. Drive of each of the pumps P is controlled, which allows for supply of the electrolytic solution DE to each of the separator chambers 12R and discharge thereof from each of the separator chambers 12R.

The electrolytic solution DE passes through the separator chambers 12R and spreads over the fuel member 13 to contact the same. This causes chemical reaction to develop the electromotive force of the cell. The separator chamber 12R from which the electrolytic solution DE is discharged cannot make the electrolytic solution DE contact with the fuel member 13; therefore no electromotive force of the cell is developed in that part.

Referring to FIG. 3A, only the center separator chamber 12R3 is supplied with the electrolytic solution DE. Therefore, only the separator chamber 12R3 comes into contact with the fuel member 13, and a contact area SS6 has a minimum size in the magnesium cell 3B.

Referring to FIG. 3B, the three separator chambers 12R2-12R4 provided in the middle are supplied with the electrolytic solution DE. Therefore, the three separator chambers 12R2-12R4 come into contact with the fuel member 13, and a contact area SS7 is larger than the contact area SS6 by approximately three times.

Referring to FIG. 3C, all of the five separator chambers 12R1-12R5 are supplied with the electrolytic solution DE. Therefore, all of the five separator chambers 12R1-12R5 come into contact with the fuel member 13, and a contact area SS8 has a maximum size in the magnesium cell 3B.

As discussed above, the contact area SS is varied by controlling whether or not to supply the electrolytic solution DE to the separator chambers 12R1-12R5. When the contact area SS is varied, the degree of chemical reaction in the magnesium cell 3B changes. This enables the magnesium cell 3B to produce electric power depending on the change.

In this embodiment, the number of separator chambers 12R is set at 5. Instead of this, however, the number of separator chambers 12R may be 4 or smaller, or, alternatively, 6 or greater. The contact areas of the separator chambers 12R may have the same size, or, may have different sizes. In the latter case, if the ratio of the contact areas of the separator chambers 12R is set at a multiple of 2 in order, the size of the entirety of the contact area SS can be finely controlled step by step depending on the combination of the contact areas SS. The same is similarly applied to the embodiments provided below.

The partition member 16 may be a plate-like member made of synthetic resin such as polyethylene or polypropylene. The partition member 16 may be made of other materials and may have other shapes. The pump P, the tube 22, and the electrolytic solution tank 23 may have a variety of structures and shapes.

The pump P is used to supply the electrolytic solution DE to each of the separator chambers 12R or to discharge the electrolytic solution DE therefrom. The supply and discharge of the electrolytic solution DE may be performed by a method other than the use of the pump P.

Third Embodiment

Figure 5A:
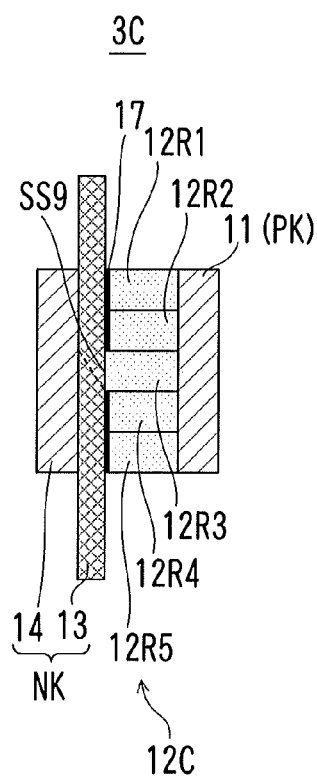
FIGS. 5A-5C are diagrams illustrating a magnesium cell according to a third embodiment of the present invention.
Figure 5B:
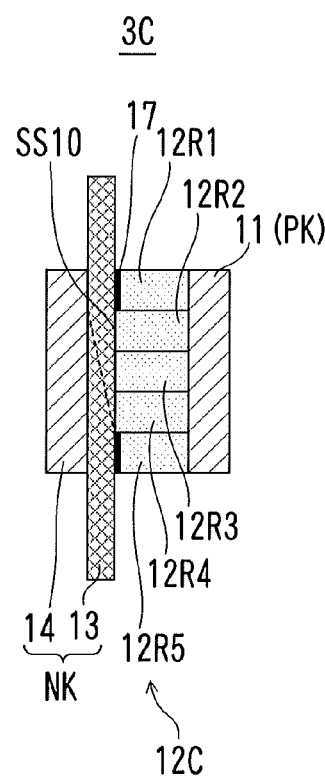
Figure 5C:
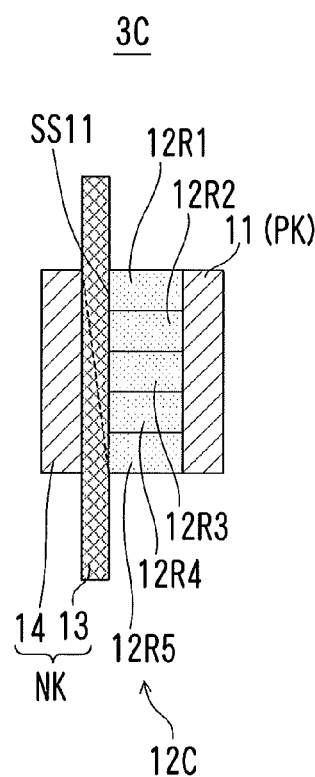

FIGS. 5A-5C are diagrams illustrating a magnesium cell 3C according to the third embodiment of the present invention.

Referring to FIGS. 5A-5C, the magnesium cell 3C includes the positive electrode member 11, a separator 12C, the fuel member 13, and the negative electrode member 14.

As with the foregoing separator 12B, the separator 12C includes the separator chambers 12R1, 12R2, ..., and 12R5 which are partitioned and provided on a plane along the surface of the fuel member 13.

An electrolytic solution is supplied to each of the separator chambers 12R1-12R5, and held therein. A shield member 17 is selectively inserted into a contact part between the fuel member 13 and the separator chambers 12R1-12R5. Thereby, the contact area SS with the fuel member 13 can be varied.

Referring to FIG. 5A, the shield member 17 is inserted into each of the four separator chambers 12R1, 12R2, 12R4, and 12R5, which does not allow the separator chambers 12R1, 12R2, 12R4, and 12R5 to contact the fuel member 13. Only the separator chamber 12R3 provided in the center comes into contact with the fuel member 13. Therefore, a contact area SS9 has a minimum size in the magnesium cell 3C.

Referring to FIG. 5B, the shield member 17 is inserted into each of the two separator chambers 12R1 and 12R5, which allows the three separator chambers 12R2-12R4 provided in the middle to contact the fuel member 13. Therefore, a contact area SS10 is larger than the contact area SS9 by approximately three times.

Referring to FIG. 5C, no shield member 17 is inserted into the separator chambers 12R1-12R5, which allows all of the five separator chamber 12R1-12R5 to contact the fuel member 13. Therefore, a contact area SS11 has a maximum size in the magnesium cell 3C.

As discussed above, the contact area SS is varied by controlling whether or not to insert the shield member 17 into the separator chambers 12R1-12R5. When the contact area SS is varied, the degree of chemical reaction in the magnesium cell 3C changes. This enables the magnesium cell 3C to produce electric power depending on the change.

The shield member 17 may be a plate-like member made of synthetic resin. The shield member 17 may be made of other materials and may have other shapes. In order to insert or remove the shield member 17, a solenoid, motor, or other types of driving mechanisms may be used.

Fourth Embodiment

Figure 6A:
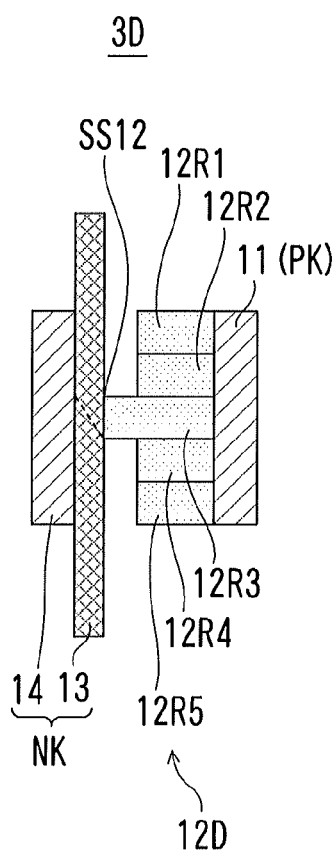
FIGS. 6A-6C are diagrams illustrating a magnesium cell according to a fourth embodiment of the present invention.
Figure 6B:
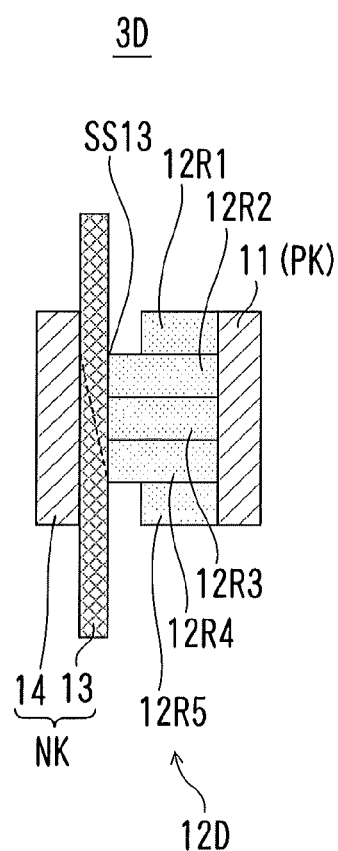
Figure 6C:
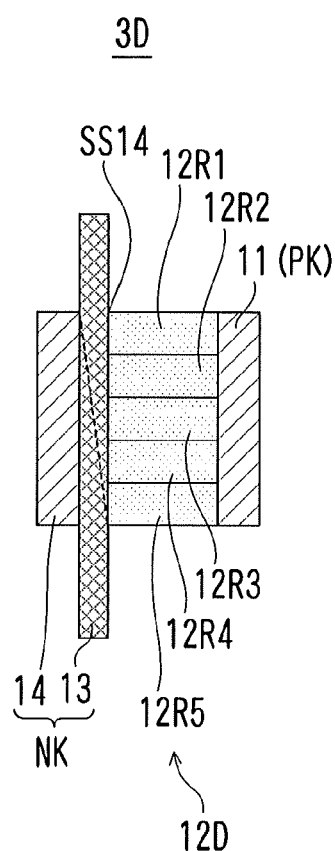

FIGS. 6A-6C are diagrams illustrating a magnesium cell 3D according to the fourth embodiment of the present invention.

Referring to FIGS. 6A-6C, the magnesium cell 3D includes the positive electrode member 11, a separator 12D, the fuel member 13, and the negative electrode member 14.

As with the foregoing separator 12B, the separator 12D includes the separator chambers 12R1, 12R2, . . . , and 12R5 which are partitioned and provided on a plane along the surface of the fuel member 13. An electrolytic solution is supplied to each of the separator chambers 12R1, 12R2, . . . , and 12R5, and reserved therein.

Figure 7:
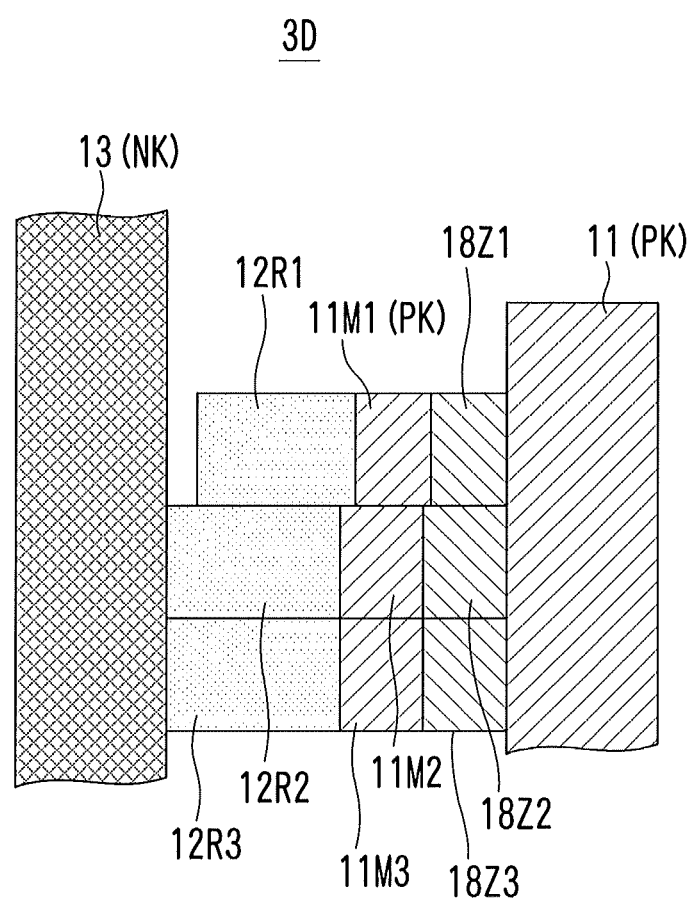
FIG. 7 is a diagram showing an example of a magnesium cell according to a fourth embodiment.

Referring to FIG. 7, the separator chambers 12R1-12R5 have, on one of their ends, positive members 11M1-11M5 and expansion driving members 18Z1-18Z5, respectively. The other ends of the expansion driving members 18Z1-18Z5 are fixed to the positive electrode member 11.

The positive members 11M1-11M5 constitute a part of the positive electrode PK. The positive members 11M1-11M5 are made of metal materials such as iron and copper, or carbonaceous materials such as activated carbons, carbon fibers, carbon felts, and carbon powder. The positive members 11M1-11M5 are movable with respect to the positive electrode member 11. The positive members 11M1-11M5 are electrically connected to the positive electrode member 11 through a non-illustrated conductive material.

The expansion driving members 18Z1-18Z5 serve to drive units having the separator chambers 12R1-12R5 and the positive members 11M1-11M5 respectively to move the same to a contact position or removal position with respect to the fuel member 13. The expansion driving members 18Z1-18Z5 may be, for example, an electric actuator such as a piezoelectric element, or, an electromagnetic actuator such as a solenoid or motor.

The expansion driving members 18Z1-18Z5 are driven selectively, so that the separator chambers 12R1-12R5 corresponding thereto come into contact with the fuel member 13. Thereby, the contact area SS between the separator 12D and the fuel member 13 can be varied.

Referring to FIG. 6A, only the center separator chamber 12R3 is moved to the contact position to come into contact with the fuel member 13. Therefore, a contact area SS12 has a minimum size in the magnesium cell 3D.

Referring to FIG. 6B, the three separator chambers 12R2-12R4 provided in the middle are moved to the contact position to come into contact with the fuel member 13. Therefore, a contact area SS13 is larger than the contact area SS12 by approximately three times.

Referring to FIG. 6C, all of the five separator chambers 12R1-12R5 are moved to the contact position to come into contact with the fuel member 13. Therefore, a contact area SS14 has a maximum size in the magnesium cell 3D.

As discussed above, the contact area SS is varied by selectively driving the expansion driving members 18Z1-18Z5 corresponding to the separator chambers 12R1-12R5. When the contact area SS is varied, the degree of chemical reaction in the magnesium cell 3D changes. This enables the magnesium cell 3D to produce electric power depending on the change.

Fifth Embodiment

Figure 8A:
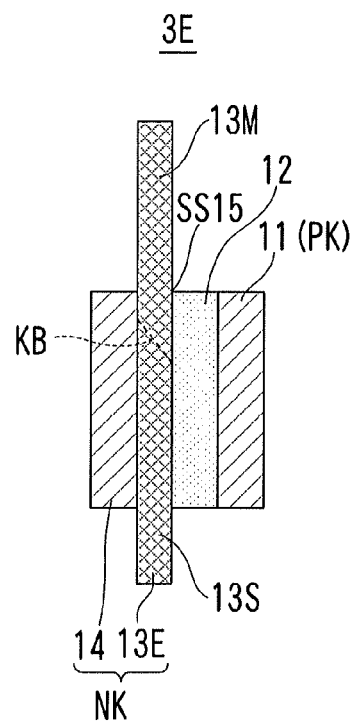
FIGS. 8A-8C are diagrams illustrating a magnesium cell according to a fifth embodiment of the present invention.
Figure 8B:
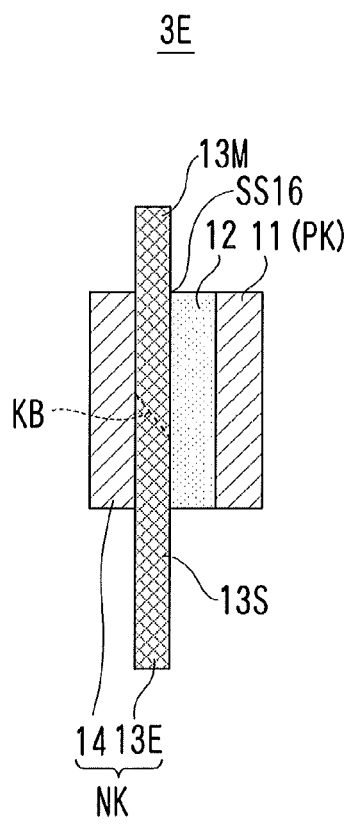
Figure 8C:
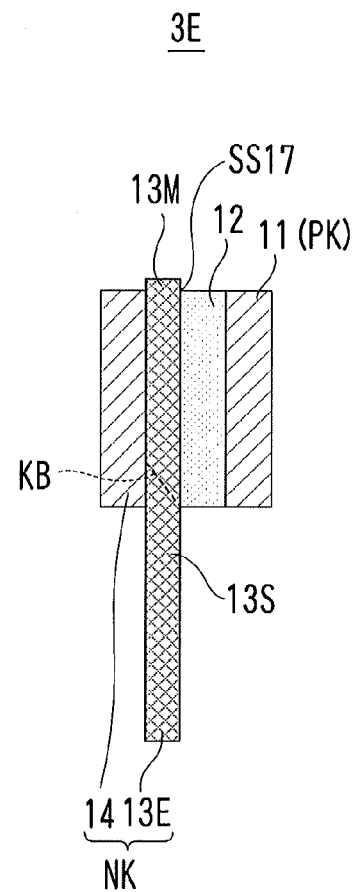

FIGS. 8A-8C are diagrams illustrating a magnesium cell 3E according to the fifth embodiment of the present invention.

Referring to FIGS. 8A-8C, the magnesium cell 3E includes the positive electrode member 11, the separator 12, a fuel member 132, and the negative electrode member 14.

The fuel member 13E includes a magnesium alloy. The fuel member 13E is placed so as to come into contact with the separator 12. The fuel member 13E is movable between the separator 12 and the negative electrode member 14 while maintaining contact therewith.

The fuel member 13E is sectioned into a used part 13S and an unused part 13M based on the use history, and the middle thereof is a boundary KB. The fuel member 13E is configured in such a manner that, when a part thereof contacting the separator 12 is spent, the fuel member 13E is moved downward in the drawing by manual operation or an appropriate driving device, and thereby, the unused part 13M comes into contact with the separator 12 to cause the chemical reaction necessary as a cell.

The fuel member 13E is moved as discussed above, which makes it possible to change an area in which the unused part 13M of the fuel member 13E contacts the separator 12, i.e., the contact area SS.

Referring to FIG. 8A, the boundary KB is positioned in the upper side. A contact area SS15 between the separator 12 and the unused part 13M has a minimum size in the magnesium cell 3E.

Referring to FIG. 8B, the boundary KB is positioned in the middle. A contact area SS16 between the separator 12 and the unused part 13M is larger than the contact area SS15.

Referring to FIG. 8C, the boundary KB is positioned in the lower side. A contact area SS17 between the separator 12 and the unused part 13M has a substantial maximum size in the magnesium cell 3E.

As discussed above, the contact area SS between the unused part 13M and the separator 12 is varied by moving the fuel member 13E. When the contact area SS is varied, the degree of chemical reaction in the magnesium cell 3E changes. This enables the magnesium cell 3E to produce electric power depending on the change.

Embodiment of Magnesium Cell System

Figure 10:
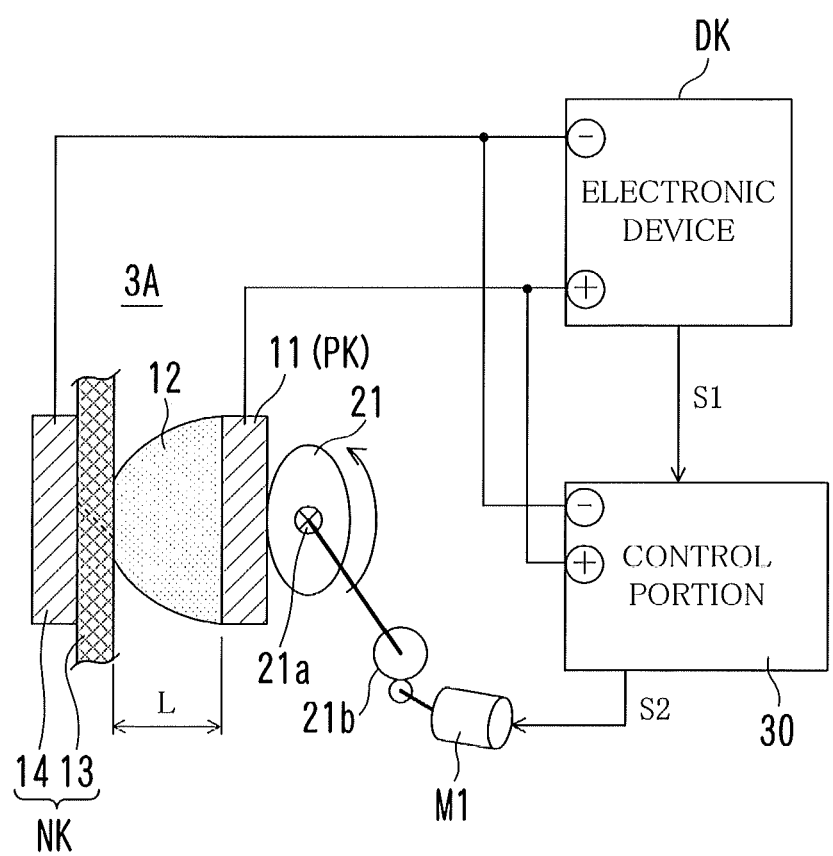
FIG. 10 is a block diagram showing an embodiment of a magnesium cell system.

FIG. 10 is a block diagram showing an embodiment of a magnesium cell system 1 using the magnesium cell 3A.

Referring to FIG. 10, the magnesium cell system 1 includes the magnesium cell 3A, an electronic device DK which is a loading device, and a control portion 30.

As described earlier with reference to FIG. 2, the magnesium cell 3A includes the positive electrode member 11, the separator 12, the fuel member 13, the negative electrode member 14, and the cam member 21. Further, a motor M1 functioning as a driving portion for rotating the cam member 21 and a gear 21b are provided. The contact area SS between the separator 12 and the fuel member 13 of the magnesium cell 3A is varied depending on the amount of rotation of the motor M1 or the angle of rotation thereof, which controls the electric power generation.

The electronic device DK is operable by using the magnesium cell 3A as a power source, and works by receiving the power supplied from the magnesium cell 3A. Examples of the electronic device DK are a personal computer, tablet PC, mobile phone, smartphone, other terminal devices, communication device, data processing device, image display device, and other devices.

The electronic device DK has a variety of operation modes related to power consumption. The operation modes are, for example, a normal mode, sleep mode, standby mode, and power saving mode. The electronic device DK outputs, to the control portion 30, a signal S1 indicating which of the operation modes is currently set.

The control portion 30 controls the motor M1 functioning as the driving portion in accordance with the operation state of the electronic device DK. The control portion 30 controls the motor M1 in such a manner that the contact area SS in the magnesium cell 3A is increased as the load by the electronic device DK is increased.

The control portion 30 works by using the magnesium cell 3A as a power source, and controls the angle of the rotational position of the cam member 21 of the magnesium cell 3A based on the signal S1 outputted from the electronic device DK.

The control portion 30 controls the electric power generation of the magnesium cell 3A in accordance with the operation mode of the electronic device DK. Supposing that, for example, the minimum value and the maximum value of the electric power generation of the magnesium cell 3A are set at 0 (zero) and 100 respectively, the control portion 30 controls the electric power generation to be an appropriate value of the range from 10-100 in accordance with the operation mode of the electronic device DK. The reason for setting the minimum value of the electric power generation of the magnesium cell 3A at 10 is to ensure power necessary to operate the control portion 30 itself.

The specific examples are as follows: The electric power generation is set at 100 for the case where the electronic device DK is put in the normal mode. The electric power generation is set at 15 for the case where the electronic device DK is put in the sleep mode or the standby mode. The electric power generation is set at 10 for the case where the electronic device DK is turned OFF.

As discussed above, in the magnesium cell system 1, the operation state of the electronic device DK is detected, the detection signal thereof is used as a feedback signal, and the angle of the rotational position of the cam member 21 in the magnesium cell 3A which is the control target is controlled. Then, control is so performed that the electric energy produced by the magnesium cell 3A has an optimum value with respect to the electric energy consumed by the electronic device DK and the control portion 30.

In the foregoing example, control is performed by using the operation mode of the electronic device DK as a feedback signal. Another control is possible in which current entering to the electronic device DK is detected and the current value is used as a feedback signal. Yet another control is possible in which the motor M1 is so controlled that various parameters such as electric power generation, output power, output current, and output voltage of the magnesium cell 3A are made to be close to the target values.

In the magnesium cell system 1, it is possible to use any one of the magnesium cells 3B-3E instead of the magnesium cell 3A. The loading device may be various electric products or mechanical products other than the electronic device DK.

According to the magnesium cells 3, 3A-3E in the foregoing embodiments, it is possible to provide a magnesium cell which allows for stable supply of necessary electric power when needed, and also allows for efficient use of magnesium fuel.

According to the foregoing magnesium cell system 1, it is possible to control electric power generation of the magnesium cell 3A to have an optimum value in accordance with the operation state of the electronic device DK functioning as a loading device.

The present invention may be implemented by combining two or more of the embodiments together.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A magnesium cell comprising:
   a positive electrode;
   a negative electrode including a magnesium alloy;
   a separator disposed between the positive electrode and the negative electrode to hold an electrolytic solution; and
   a contact area varying unit configured to manipulate at least a portion of the separator such that a contact area between the negative electrode and the separator is varied depending on an operation state of a loading device, the loading device operating by electric power extracted from the positive electrode and the negative electrode.

2. The magnesium cell according to claim 1, wherein
   the separator is made of a porous material and holds the electrolytic solution therein, and
   when a pressing force is applied to the separator from the positive electrode side to the negative electrode side, the separator deforms elastically, and the contact area between the negative electrode and the separator is variable depending on an amount of the deformation of the separator.

3. The magnesium cell according to claim 1, wherein
   the separator includes a plurality of separator chambers which are partitioned and provided on a plane along a surface of the negative electrode, and
   the contact area between the negative electrode and the separator is variable by selectively supplying the electrolytic solution to the separator chambers to cause the separator chambers to hold the electrolytic solution therein.

4. The magnesium cell according to claim 1, wherein the separator includes a plurality of separator chambers which are partitioned and provided on a plane along a surface of the negative electrode, and the contact area between the negative electrode and the separator is variable by selectively inserting a partition member between the negative electrode and the separator chambers.

5. The magnesium cell according to claim 1, wherein the separator includes a plurality of separator chambers which are partitioned and provided on a plane along a surface of the negative electrode, and the contact area between the negative electrode and the separator is variable by selectively moving the separator chambers to a contact position with the negative electrode or a spaced position from the negative electrode.

6. The magnesium cell according to claim 1, wherein the negative electrode includes a fuel member that includes a magnesium alloy and is contactable to the separator, and a negative electrode member that is disposed to be in contact with the fuel member, and the fuel member is movable between the separator and the negative electrode member while maintaining contact therewith.

7. The magnesium cell according to claim 6, wherein an area in which an unused part of the fuel member contacts the separator is variable by moving the fuel member.

8. A magnesium cell system comprising:

a magnesium cell including a positive electrode, a negative electrode having a magnesium alloy, a separator disposed between the positive electrode and the negative electrode to hold an electrolytic solution, and a driving portion for changing a contact area between the negative electrode and the separator by manipulating at least a portion of the separator; and a control portion configured to control the driving portion depending on an operation state of a loading device, the loading device operating by electric power extracted from the positive electrode and the negative electrode; wherein the control portion controls the driving portion in such a manner that the contact area between the negative electrode and the separator is increased as a load by the loading device is increased.

9. The magnesium cell system according to claim 8, wherein the control portion controls the driving portion depending on an operation mode of the loading device.

* * * * *